Oct. 4, 1955 — C. A. SMITH — 2,719,533
THERMOSTATIC CUT-OFF VALVE WITH MANUAL RESET
Filed Feb. 2, 1952 — 3 Sheets-Sheet 2
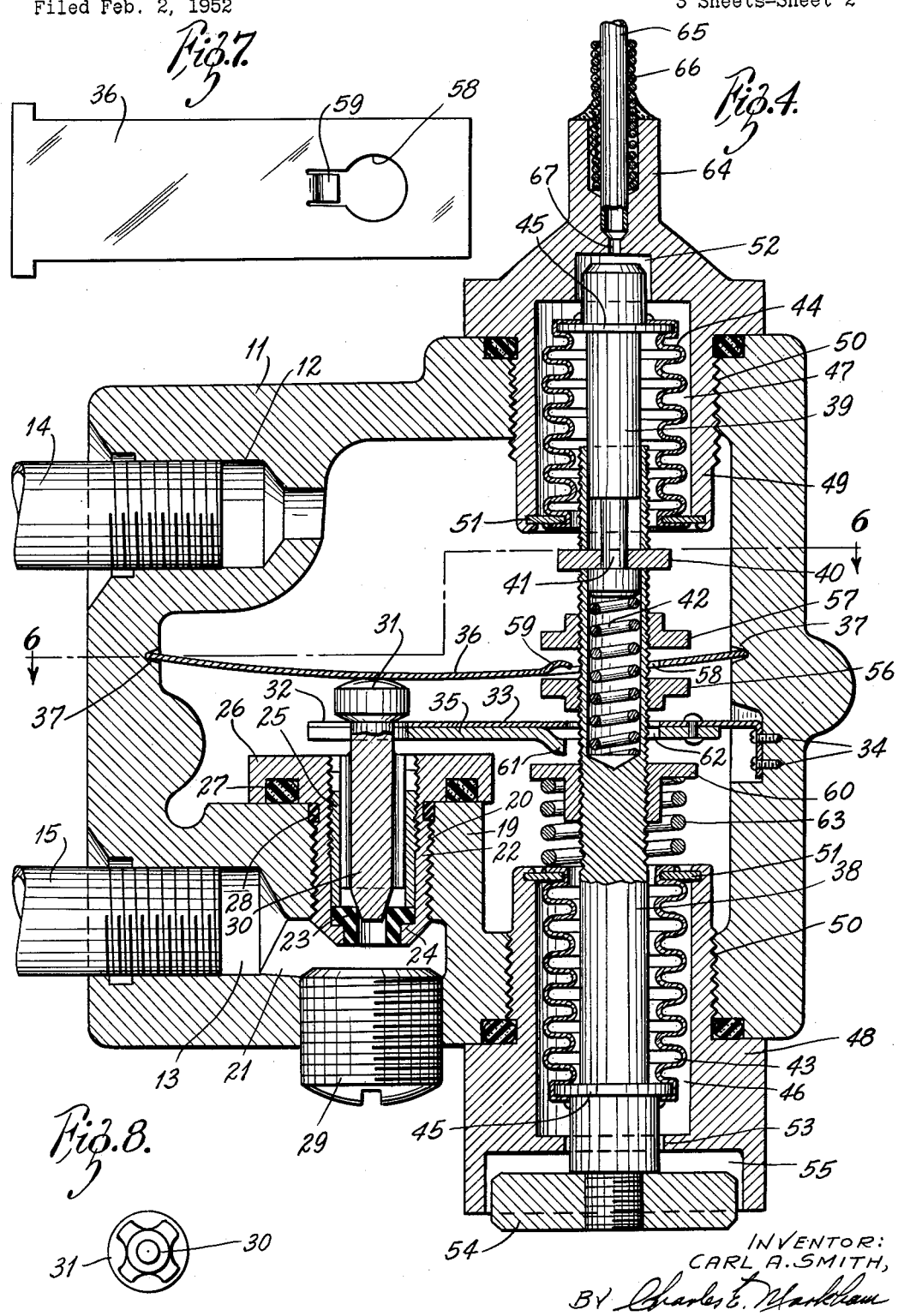
INVENTOR:
CARL A. SMITH,
BY Charles E. Markham
HIS AGENT United States Patent Office 2,719,533
Patented Oct. 4, 1955

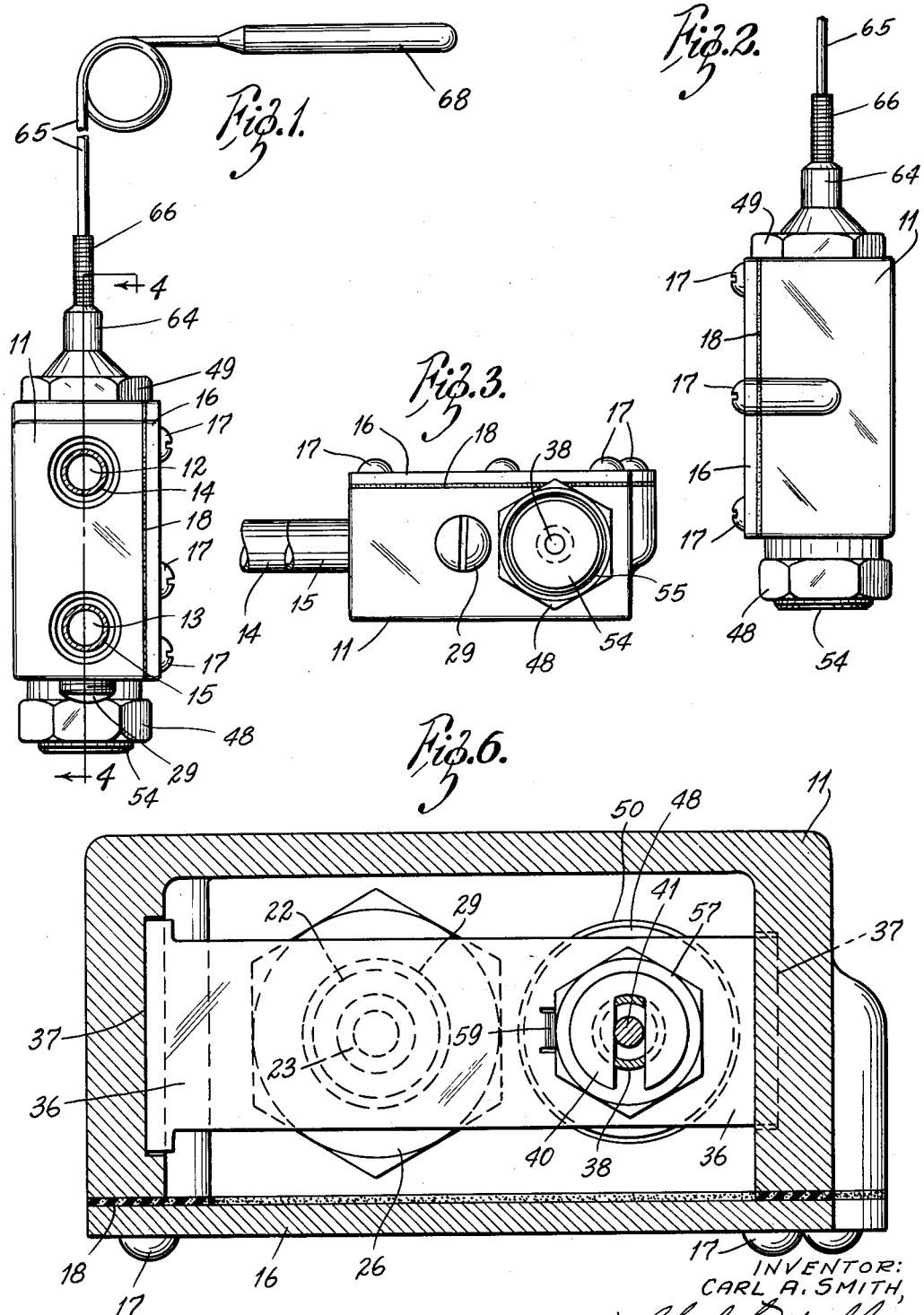

2,719,533

THERMOSTATIC CUT-OFF VALVE WITH MANUAL RESET

Carl A. Smith, Affton, Mo., assignor to Missouri Automatic Control Corporation, St. Louis, Mo., a corporation of Missouri Application February 2, 1952, Serial No. 269,625

5 Claims. (Cl. 137—80)

This invention relates to thermostatically operated valves and particularly to fuel cut-off valves which are arranged to be manually set in an open position and which function automatically to cut off fuel supply when a predetermined temperature is reached.

The primary object of the invention is to provide a generally new and improved device of this character which is particularly adapted to use in high pressure fuel systems, and which is of simple and rugged construction, reliable in operation, and particularly sensitive to temperature change.

A further object is to provide a device of this character having novel means for imparting a snap-action closing movement to the valve when the temperature limit is reached, which means is arranged to be returned to a precise position upon being reset, whereby the valve may be actuated in a valve closing direction by exactly the same force and movement of the thermal actuator in each instance of operation.

A further object is to provide a device of this kind having a completely sealed valve chamber and having a thermostatic valve actuator and a manual valve actuator both of which extend interiorly and exteriorly of the chamber and both of which are provided with a sealing bellows and are interconnected so that internal pressure acting on one of the actuators is compensated by its action on the other.

These and further objects and advantages will become apparent when the following description is read in connection with the accompanying drawings.

In the drawings:

Figs. 1 and 2 are opposite end views of a device constructed in accordance with the present invention;

Fig. 3 is a bottom view of the device;

Figs. 4 and 5 are longitudinal sectional views, both being taken on line 4—4 of Fig. 1. Fig. 4 shows the device in a cut-off position and Fig. 5 shows the device in a reset position;

Fig. 6 is a transverse sectional view taken on line 6—6 of Fig. 4;

Fig. 7 is a top view of the snap-action valve spring and is shown apart from the device; and Fig. 8 is a bottom view of the fluted needle valve also shown apart from the device.

Figure 5:
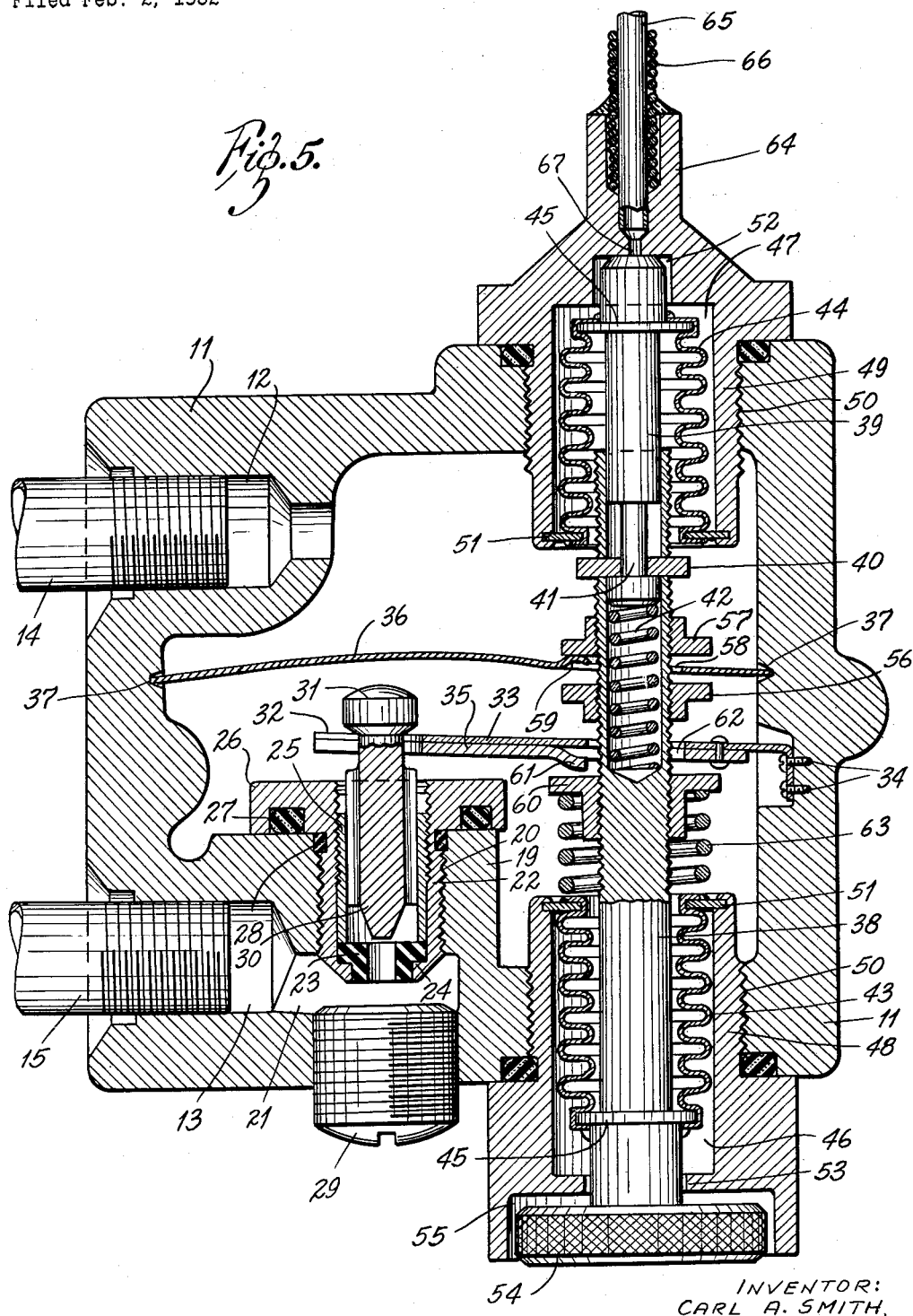

With more particular reference to the arrangement and construction of the illustrated form of the invention, a valve housing is indicated at 11 having an inlet passage 12 and an outlet passage 13 extending in substantially parallel relationship through the left end wall of the housing. The inlet and outlet passages are provided with suitable internal threads for the threaded connection of fuel conduits 14 and 15 to the housing. The housing is further provided with a detachable side cover plate 16, which provides convenient access to the entire interior of the valve housing. The cover plate is attached by screws 17, and a suitable gasket 18 is provided between the cover plate and housing to insure a fluid pressure tight seal.

Adjacent the outlet passage 13 is an internal boss 19 having a screw threaded bore 20 extending therethrough perpendicular to the outlet 13 and extending from the interior to the exterior of the housing. The bore 20 and outlet 13 are connected by a passageway 21. The inner end of the threaded bore 20 receives a screw threaded hollow plug member 22, in the lower end of which a valve seat member 23 is retained by means of a shoulder 24 and an inner screw threaded sleeve member 25. The valve seat member 23 is preferably constructed of a half hard material having just sufficient deformation when engaged by the valve under moderate pressure to insure a complete seal.

The plug member 22 is provided with a head portion 26 in the under surface of which is an annular groove which receives a circular pliable gasket 27, thereby to form a seal between the head of the plug member and the top face of the boss 19. An additional pliable ring gasket 28 is provided which encircles the plug 20 and is retained in a groove near its head. The exterior end of the threaded bore 20 receives a screw threaded closure plug 29.

An elongated and fluted needle-type valve 30, having a frusto-conical tip at its lower end for engaging the valve seat 24, is slidably fitted in the inner sleeve member 25. The valve 30 is provided with a rounded head 31 at its upper end, and immediately below the head 31 is a short portion of reduced diameter which is received in the forked end 32 of a resilient valve lifting arm 33. The lifting arm 33, which extends transversely of the valve and to the right end wall of the chamber, is anchored thereto by screws 34 as indicated. The resilient arm 33 is formed so as to have a normal free position as indicated in Fig. 5, wherein the valve 20 is held thereby in an open position. The resilient lifting arm is provided with a stiffening bar 35 on its under side which permits a considerable upward force to be applied at an intermediate point thereon without causing undue flexing.

Immediately above the valve head 31 is a flat transverse spring member 36 which extends from the left to right end walls of the chamber and is received at its ends in V-shaped grooves 37 formed in the end walls. The spring member 36 is somewhat longer than the distance between the bottoms of the grooves 37 and, consequently, normally assumes a bowed shape which may be snapped from one side to the other of a line passing through the centers of opposite grooves 37 when a force is applied toward its convex side. The spring 36, when in the bowed position as shown in Fig. 4, engages the head 31 of valve 30 and exerts a considerable downward thrust thereon.

If sufficient force is applied to the lower side of spring 36, when in the position shown in Fig. 4, to force it upward through a planar shape, the spring will snap to the position shown in Fig. 5, wherein it is spaced from the valve head 31, thereby permitting the valve 30 to open freely to a full open position. It will be noted that the valve 30 is spaced somewhat to the left of the center of the length of spring 36 and that, while the movement at the point on spring 36 engaging the valve is less than at the center of its length, the force, however, which it is able to exert at this point is greater.

To the right of valve 30, see Figs. 4 and 5, and arranged parallel therewith is an actuating rod adapted to engage spring 36 near its right-hand end. This actuating rod consists of a lower section 38 and an upper section 39 which is arranged to telescope within the upper hollow portion of lower section 38. The extension of these telescoping sections is limited by a C washer 40 which is received in a slot in the wall of the lower section 38 and embraces a reduced portion 41 of upper section 39. The rod sections 38 and 39 are normally held in a fully extended position, as shown, by a relatively strong spring 42.

The outer portions of rod sections 38 and 39 extend through generally cylindrical shaped accordion-type bellows members 43 and 44 respectively and are attached near their outer ends to the outer ends of their respective bellows. The outer ends of the bellows are attached as by crimping and soldering to flanges 45, near the outer ends of the rod sections, in such manner as to provide a pressure tight seal. The outer portions of rod sections 38 and 39, together with their surrounding bellows, are received in lower and upper chambers 46 and 47 respectively, formed in a pair of screw threaded closing plugs 48 and 49. The closing plugs in turn are received in screw threaded openings 50 in the lower and upper walls of chamber 11. The inner ends of the bellows are attached to the inner ends of hollow plugs 48 and 49 by means of washers 51, which are crimped and soldered at their periphery in the inner open ends of the hollow plugs. The inner ends of the bellows are entered into the washer apertures and attached thereto as by crimping and soldering, as indicated. The bellows are thus centered at one end in the chambers 46 and 47. The other ends of the bellows, as well as the telescoping actuating rod, are centered in the plugs 48 and 49 by reason of a recess 52 in plug 49, which receives and guides the short projecting upper end of upper rod section 39 and the bore 53 through the bottom of plug 48 in which the lower portion of lower rod section 38 is guided. The lower end of lower rod section 38 extends exteriorly of the valve chamber and is provided with a head 54 which is received in a recess 55 in the outer end of plug 48. The plugs 48 and 49 are provided with suitable pliable gaskets, as indicated, to insure sealing at these openings.

The upper portion of lower rod section 38 is screw threaded and has threaded thereon a pair of internally threaded adjustable collars 56 and 57 which serve as abutment members for engaging the upper and lower sides of the spring member 36, the spring 36 being perforated at 58 to permit the passing through of the actuating rod. The spring 36 is preferably provided with a formed lip 59 on its upper side, adapted to be engaged by upper abutment member 57. There is also a threadedly adjustable collar 60 on the rod section 38 spaced downward from the valve lifting arm 33 and arranged to engage a lip 61 formed on the underlying stiffening bar 35 so that when the actuating rod is moved upward a sufficient amount the lifting arm 33 will be engaged and the valve opened. The valve lifting arm is substantially wider than the diameter of the actuating rod and is perforated at 62 to permit the rod to pass through. The entire actuating rod and bellows assembly is normally urged upward by a spring 63 biased between collar 60 and the plug 48. The spring 63 is considerably weaker than the extension spring 42 and has as its purpose the upward return of the actuating assembly to the point where the upper end of rod section 39 bottoms in the recess 52. It does not have sufficient strength to compress spring 42 to telescope the rods under any conditions.

The upper end of the upper closure plug 49 is provided with a hollow extension 64 which receives one end of a capillary tube 65 which is attached therein as by soldering so as to form a fluid tight seal. The end portion of the capillary tube is preferably reinforced by as a wrapping of wire 66. The hollow extension 64 communicates with the chamber 47 by means of a short passage 67. The opposite end of capillary tube 65 is connected, by means forming a fluid tight connection, to a feeler bulb 68, see Fig. 1. It will be seen that chamber 47 in upper plug 39 and the feeler bulb 68 are in communication and that, together with the connecting capillary tube, they form a sealed system. This system is filled with a thermally expansible liquid having a fairly high boiling point such as, for instance, xylene (ortho).

*In operation*

In Fig. 5, the device is shown in a reset position in which the snap action spring 36 is in an upwardly bowed position and the valve 30 is held open by the resilient arm 33. Also, in this position, the volume of expansible liquid, due to reduced temperature, is such that the upper end of the telescoping actuating rod is permitted to move into abutment with the bottom of recess 52 under the urging of return spring 63.

With a rise in the temperature to which bulb 68 is sensitive, the volume of liquid in chamber 47 will increase, collapsing the bellows 44 and causing the rods 38 and 39 to be moved downward. As the collar 57 on rod section 38 moves downward, the upwardly bowed spring 36 is engaged thereby on its upper surface, and at some point, the spring snaps through a planar shape to assume an oppositely bowed position, and in doing so engages the valve 30, moving it rapidly to a closed position, whereupon the device assumes the cut-off position shown in Fig. 4. It is to be understood that spring 42 is also sufficiently strong to overcome snap-spring 36 without any flexing of itself. Also, the resilient lifting arm 33 is considerably weaker than the spring 36 and offers no appreciable resistance to the closing of the valve, its function being to merely hold the valve open. It will be seen that by adjusting collar 57 on rod section 38, the temperature at which the valve is actuated to cut-off position may be conveniently varied.

When the device is in the position shown in Fig. 4 and it is desired to reset the valve in an open position, pressure is applied manually to the head 54 at the lower end of the rod section 38. Upward movement of the rod causes collar 60 to engage the lifting arm 33 at 61 on its stiffened portion, and the spring 36 is urged by engagement of the valve head to snap into an upwardly bowed position, thus permitting the valve to remain held open by arm 33. If the temperature affecting feeler bulb 68 is below a predetermined point, the device will remain thus when the manual pressure on 54 is released. If, however, the temperature at bulb 68 is too high and, consequently, the volume of liquid in chamber 47 too great to permit sufficient upward movement of upper rod section 39 at the time an attempt to reset is made, then the upper section of the rod will merely telescope within the lower section, and as soon as the manual pressure on head 54 is released, the spring 42 will again return the lower rod section to a cut-off position.

It is to be further understood that the adjustment of collars 56 and 60 is such that the upward movement of the actuating rod assembly, under the urging of spring 63, to its upper limit when bottomed in recess 52 is insufficient to reset the device or lift the valve. The additional upward movement of collar 60 required to accomplish resetting must be obtained by upward pressure on the head 54 and a telescoping of the rod sections against spring 42. The spring 36 is caused to snap to an upwardly bowed position by the application of force thereto by the head of valve 30. Due to the fact that spring 36 is engaged near one end by the actuating rod, it tends to assume an S-shape in the process of snapping over center, and it has been found that by providing two spaced collars such as 56 and 57 and by properly adjusting them, this tendency may be minimized and, as a result, the mechanical advantage gained by the arrangement is retained.

It will be seen that fuel pressure, which would otherwise oppose the contraction of bellows 44 as the temperature increased, is compensated by the bellows 43, which exerts a downward pull on the actuating rod assembly which is equivalent and that, both bellows being subjected to inlet pressure, they are not differentially affected by any pressure drop through the valve port which, in the present use of the device, is often considerable. The device will function, therefore, to cut off the fuel supply at a temperature which is closely predetermined by adjustment of collar 57 irrespective of variations in pressure whether

I claim:

1. In a manually reset high temperature fuel cut-off device, a normally open valve, a bowed leaf spring adapted to engage said valve and to move it closed when said spring is snapped to a first bowed position and to permit the valve to open when snapped to a second opposite bowed position, a telescoping actuating member having spring means for holding it extended, and having one section thereof adapted to be manually operated, spaced abutments on said actuator section for engaging said leaf spring on opposite sides thereof, and a positive acting thermostatic device connected to the other of said actuator sections.

2. In a reset valve, means forming a sealed valve chamber having an inlet and an outlet, a valve in said chamber for controlling said outlet, said chamber having a pair of spaced flexible wall portions, a valve actuating member within said chamber arranged to operatively engage said flexible wall portions at spaced points thereon whereby it is moved oppositely as said wall portions are alternately deflected in the same direction, said actuating member consisting of first and second collapsible sections normally held in extended position by spring means, means on said first section for causing said valve to be actuated oppositely as said actuator is moved oppositely, manually operated means for deflecting the flexible wall portion engaged by the first section of said actuating member, and condition responsive means for deflecting the wall portion engaged by the second secton of said actuating member.

3. In a device of the class described, means forming a sealed valve chamber having an inlet and an outlet, a normally open valve in said chamber for controlling said outlet, a bowed leaf spring adapted to engage said valve and to move it closed when said spring is snapped to a first bowed position and to permit the valve to open when snapped to a second bowed position, said valve chamber having a pair of opposite flexible wall portions of equal area, a telescoping valve actuating member having a fixed limit of extension and having spring means for normally holding it extended, said member being rigidly connected at its opposite ends to the centers of said flexible wall portions, means on one section of said telescoping member for engaging said leaf spring on opposite sides thereof, and manual means for deflecting the flexible wall portion to which said section is attached, and positive acting condition responsive means for deflecting the other of said wall portions.

4. In a high temperature fuel cut-off device, a guided reciprocating valve, means for normally biasing said valve in an open position, a bowed leaf spring extending transversely across the line of movement of said valve and being retained at its ends against lateral movement, said leaf spring having a first bowed position wherein it is spaced from engagement with said valve and being movable therefrom to a second opposite bowed position wherein it engages said valve to move it to a closed position with a snap action, an actuating member spaced laterally from said valve and including means for engaging said spring near one of its ends for moving it from its first to second bowed positions, whereby a mechanical advantage with respect to required movement of said actuator is achieved, temperature responsive means operatively connected to said actuating member, and manual reset means for engaging said valve to move said valve to an open position and to thereby move said spring to its first bowed position.

5. A device as set forth in claim 4 wherein said actuating member comprises a rod extending through a perforation in said leaf spring near one of its ends and including a pair of spaced adjustable collars on said rod laying on opposite sides of said spring, whereby said spring is restrained from buckling into an S-shape as it is moved from one bowed position to the other by engagement of one of said collars.

References Cited in the file of this patent

UNITED STATES PATENTS

| | | |
|---|---|---|
| 1,603,005 | Flam | Oct. 12, 1926 |
| 1,878,929 | Kuenzli | Sept. 20, 1932 |
| 1,945,745 | Janvert | Feb. 6, 1934 |
| 2,042,523 | Graham | June 2, 1936 |
| 2,214,375 | Jackson | Sept. 10, 1940 |
| 2,217,419 | Saul | Oct. 8, 1940 |
| 2,308,861 | Clifford | Jan. 19, 1941 |
| 2,422,924 | Puster | June 24, 1947 |
| 2,490,219 | Kmiecik | Dec. 6, 1949 |